F. P. ROSBACK.
TRANSMISSION MECHANISM.
APPLICATION FILED APR. 9, 1917.

1,297,736.

Patented Mar. 18, 1919.
8 SHEETS—SHEET 7.

Inventor.
Frederick P. Rosback,

F. P. ROSBACK.
TRANSMISSION MECHANISM.
APPLICATION FILED APR. 9, 1917.

1,297,736.

Patented Mar. 18, 1919.
8 SHEETS—SHEET 8.

Witnesses:

Inventor:
Frederick P. Rosback

UNITED STATES PATENT OFFICE.

FREDERICK P. ROSBACK, OF BENTON HARBOR, MICHIGAN.

TRANSMISSION MECHANISM.

1,297,736.	Specification of Letters Patent.	Patented Mar. 18, 1919.

Application filed April 9, 1917. Serial No. 160,789.

*To all whom it may concern:*

Be it known that I, FREDERICK P. ROSBACK, a citizen of the United States, residing at Benton Harbor, in the county of Berrien and State of Michigan, have invented a new and useful Improvement in Transmission Mechanism, of which the following is a specification.

My invention relates to an improvement in transmission mechanism for use more particularly on automobiles, of the type involving intermeshing gears, the coöperating ones of which are constantly in mesh and the driving of the driven shaft in the forward and reverse directions and at different speeds relative to the engine shaft, being effected by mechanisms controlling the operative relations between the drive and the driven shafts and the various gears; and my object generally stated, is to so improve mechanisms of this general character as hitherto provided, as to adapt them to better perform, and perform in a more positive and efficient manner, the functions for which they are provided, and render this type of transmission highly satisfactory for its intended purpose.

Referring to the accompanying drawings:

Fig. 5 is a section taken at the irregular line 5 on Fig. 4 and viewed in the direction of the arrow.

Fig. 31 is a longitudinal sectional view of the counter-shaft showing the pinion carried thereby for coöperating with the gear of Fig. 20.

Figures 26, 27:
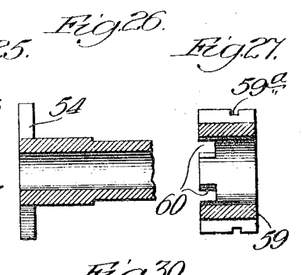
Figures 28, 32:
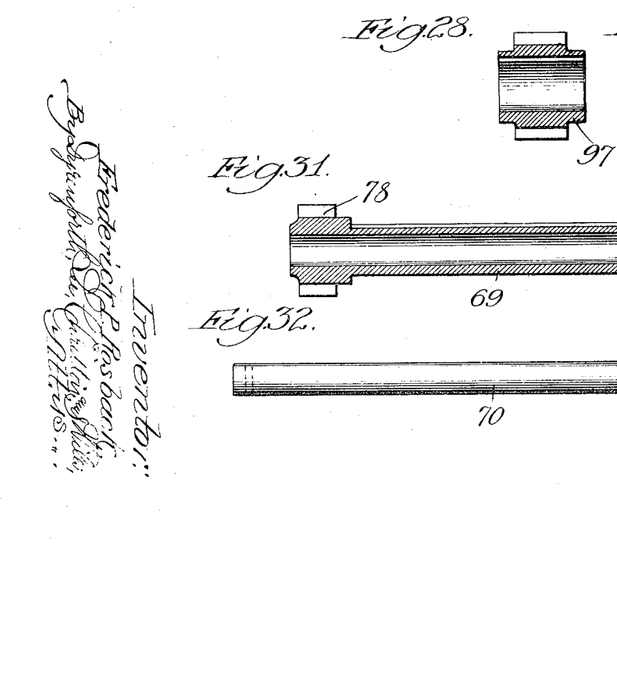
Figs. 28, 29 and 30 are similar views showing three of the pinions carried by the counter-shaft of the transmission mechanism and coöperating with the gears shown in Figs. 22, 24 and 27.
Fig. 32 is a view in side elevation of the shaft on which the counter-shaft of Fig. 31 is supported and journaled.
Figure 29:
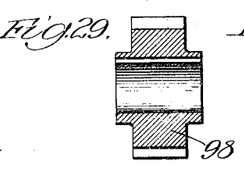
Figures 30, 33:
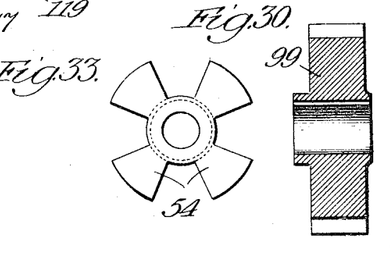
Fig. 33 is a view in end elevation of the clutch-member of Fig. 26, viewing it from the left hand side of the drawing.
Figure 34:
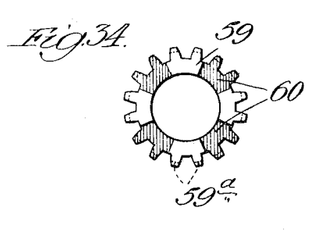
Fig. 34 is a similar view, and viewed in the same direction, of the gear of Fig. 27.

The drive-shaft of the transmission mechanism, is represented at 50, this shaft being mounted at ball-bearings 51 in an end wall 52 of the transmission-casing 53 and provided at its inner end (the left hand end in Fig. 4) with clutch-teeth 54 (Figs. 26 and 30). This shaft, which also has bearing at its reduced end 55 in a bearing 56 provided in a rotatable drive member 57 which in practice would be driven from the engine in accordance with common practice, is associated in the drawings with several coöperating parts shown as interposed between the bearings 51 and 56, but as these parts form no part of my invention and are furthermore well known to the art, it will be sufficient only to state that the shaft 50 is driven from the member 57 through the medium of the friction clutch-device 58 coöperating with the member 57 and in practice, under the control of the operator. Journaled on the shaft 50 between the clutch-teeth 54 and the bearing 51, is a gear 59, provided in the edge thereof adjacent the teeth 54, with clutch-teeth 60 adapted to intermesh with the teeth 54 when this gear is shifted to the left in Fig. 4.

The driven shaft of the mechanism is represented at 61, this shaft having bearing at the ball-bearing 62 in an end wall 63 of the transmission-casing, and at its inner reduced end 64, in a socket 65 in the inner end of the shaft 50. The opposite ends of the shaft 61 are square in cross-section, as represented at 65 and 66, respectively, the intermediate portion of this shaft, represented at 67, being cylindrical. The outer end of the shaft 61 is equipped with a universal joint connection 68 in accordance with common practice, which is connected with a rotatable member 68ª and through the medium of which the axle (not shown) is driven.

The counter-shaft of the transmission mechanism is in the form of a sleeve represented at 69 and shown as supported, and rotatable, on a stationary shaft 70 fixed at its ends in the walls 52 and 63 of the transmission-casing.

Journaled on the cylindrical portion 67 of the shaft 61, is a gear 71, this gear having a series of clutch-teeth 72 on one face thereof (the right hand side in Fig. 4) which extend through a circular opening 73 in a partition wall 74 formed in the casing 53. The gear 71 meshes with a gear 75 mounted on a shaft 76 journaled in the partition 74 and the wall 63 of the casing, this last-referred-to wall being provided as a part separate from the main portion of the casing and secured to the latter in spaced relation to the partition 74, by means of bolts 77. The gear 75 meshes with a relatively smaller gear 78 formed integrally with the counter-shaft 69, the three gears last referred to constituting the reversing mechanism of the transmission.

Surrounding the squared portion 66 of the shaft 61 and longitudinally movable thereon relative to each other, are the clutch and gear members 79, 80, 81, 82 and 83 of Figs. 21 to 25 inclusive respectively, these members being arranged on the shaft 61 from the left hand end of the portion 66 thereof, to the right-hand end of this shaft in the order shown in Figs. 21 to 25 inclusive. The clutch members 79, 81 and 83 contain squared openings therethrough at which these members fit over the squared portion 66 of the shaft whereby the shaft 61 is caused to be driven through the medium of these clutch-members when brought into interlocking relation with the coöperating gears, as hereinafter described. The members 79 and 81, are identical, these members being provided on their left hand faces in Figs. 21 and 23 respectively, with clutch-teeth 84 and 85, respectively, and having their right hand ends of reduced diameter as represented at 86 and 87, respectively, the clutch-teeth 84 being provided for coöperation with the clutch-teeth 72 on the gear 71. The gears 80 and 82 are of the same construction, the latter being of greater diameter, these gears being recessed as indicated at 88, 89, 90, and 91, respectively, the gear 80 having journal support at its recesses 88 and 89 on the outer periphery 92 of the member 79 and the outer periphery of the reduced portion 86 of this member, respectively, and the gear 82 having journal support at its recesses 90 and 91 on the outer periphery 93 of the member 81 and the periphery of its reduced portion 87, respectively, the gear 80 being provided on its right hand face in Fig. 22 with clutch-teeth 94 adapted to interlock with the teeth 85 on the member 81 when these parts are moved into interlocking relation. The member 83 is merely a clutch member, it being provided on its right hand face in Fig. 25 with clutch-teeth 95 adapted to be moved into interlocking relation with the teeth 54, and on its left hand face in this figure with clutch-teeth 96 adapted to be interlocked with the teeth 91 of the gear 82 when these parts are moved relatively toward each other. It will be understood from the foregoing that while the members 79, 81 and 83 are so connected with the shaft 61 that these parts can not independently rotate, though they are adapted to slide along this shaft, the gears 80 and 82 by being journaled on the members 79 and 81, are free to rotate thereon and relative to the shaft 61 excepting when interlocked with a clutch-member, under the control of the operator as hereinafter described.

The gears 80 and 82 mesh with gears 97 and 98, respectively, splined on the counter-shaft 69, and the gear 59 meshes with a gear 99 splined on this counter-shaft.

Figure 4:
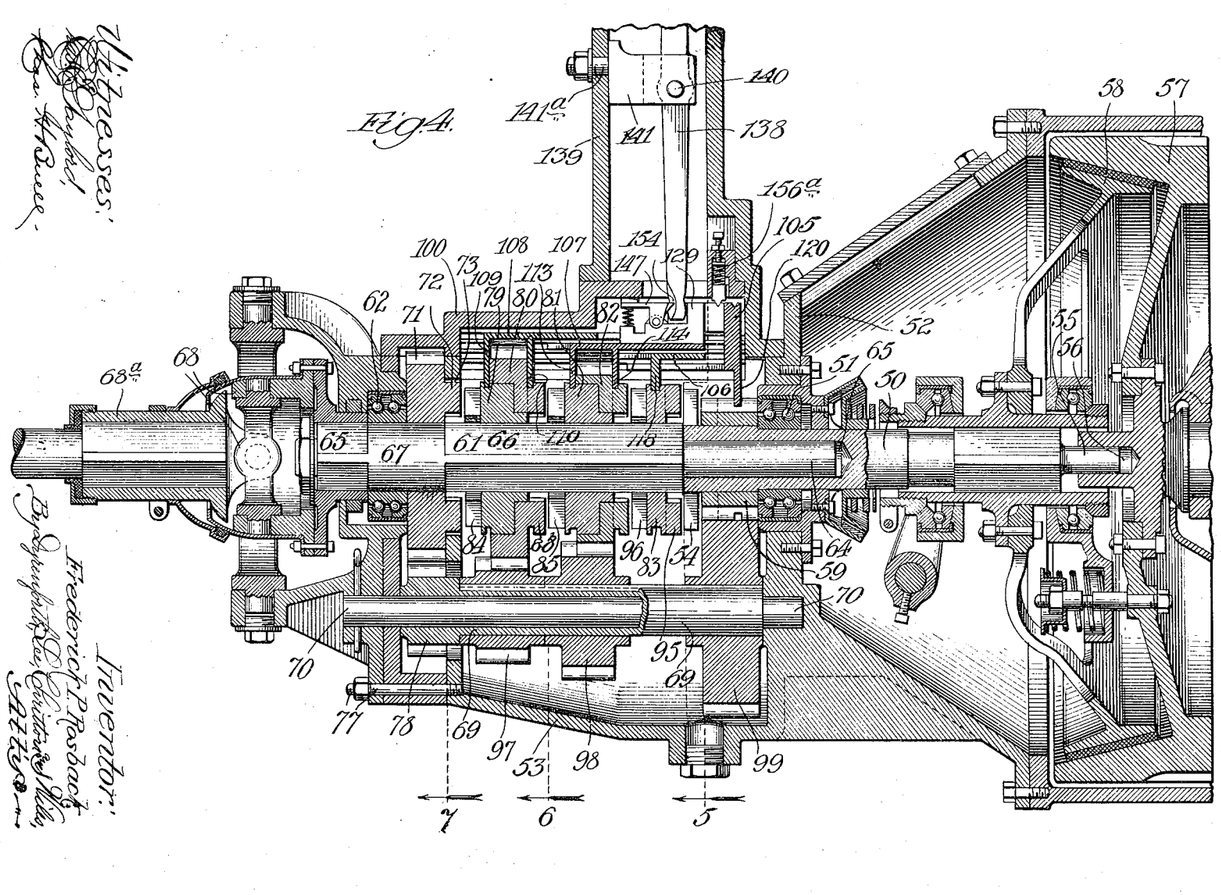
Fig. 4 is a view similar to Fig. 3 showing the gears, clutches and controlling mechanisms, in sections.

As a preface to a description of the manual means controlling the shifting of the various parts to effect the desired speed of transmission, it may be stated that normally, or in other words when the controlling mechanism is in neutral position, the parts are in the positions as shown in Fig. 4, or in other words none of the clutches shown in Figs. 20 to 34 inclusive are in interlocked relation, though all of the gears are in mesh. Low speed forward is obtained by interlocking the teeth 60 and 54 and the teeth 94 and 85, by shifting the gear 59 and the clutch 81 to the left, in Fig. 4, the gear 82 shifting with this clutch, this causing the shaft 50 to drive the gear 59 through the teeth 54 and 60, which drives the gear 99, counter-shaft 69, gear 97, gear 80 and clutch-member 81, through the medium of the interlocking teeth 85 and 94, and the shaft 61. While the gears 78, 75, 71, 98 and 82 are driven in this operation, they all operate as idlers.

Medium speed forward is effected by shifting the gear 59 and the clutch 83 to the left in Fig. 4, the teeth 54 and 60 interlocking and the teeth 91 and 96 interlocking, thus causing the shaft 50 to drive the gear 59, gear 99, gear 98, gear 82, clutch 83 and shaft 61, it being understood that any desired ratio between the teeth on the gears 82 and 98 may be provided. In this position of the parts the gears 71, 75, 78, 80 and 97 operate as idlers.

High speed forward is produced by shifting the clutch 83 to the right in Fig. 4 to clutch the shaft 50 directly to the shaft 61, none of the gears in this position of the parts rotating.

Reverse drive of the shaft 61 is effected by shifting the gear 59 the clutch 79 and gear 80 to the left in Fig. 4 to clutch the gear 59 to the teeth 54 and interlock the teeth 84 with the teeth 72. The shaft 50 thus operates to drive the shaft 61 in a reverse direction through the clutch-teeth 54, gear 59, gear 99, counter-shaft 69, gears 78, 75, 71, clutch-teeth 72 and 84, and clutch device 79, all of the other gears operating as idlers in this position of the parts.

The following is a description of the means for controlling these various gears and clutch-members to produce the driving of the shaft 61 as stated, according to the preferred embodiment of my invention.

Figures 1, 2:
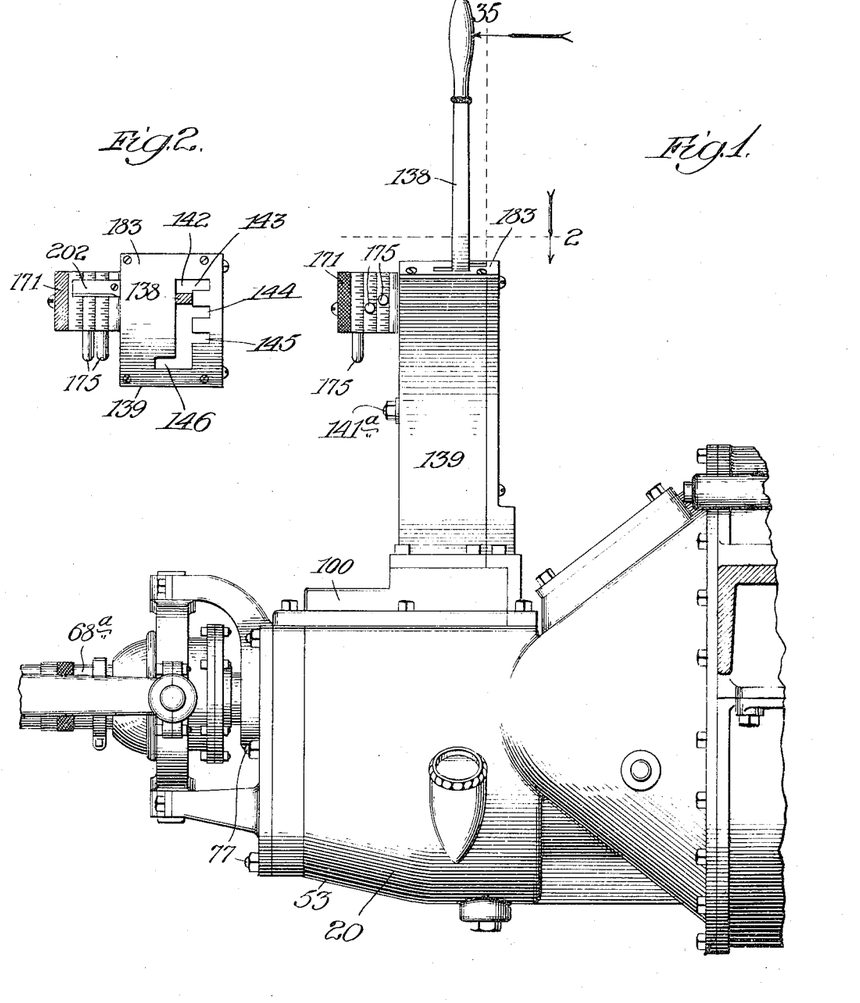
Figure 1 is a view in side elevation of a transmission mechanism and controlling means therefor, constructed in accordance with my invention, the mechanism shown being provided as a part of an automobile construction.
Fig. 2 is a plan view of the cover of the transmission-case, showing the control lever in section, this view being taken at the line 2 on Fig. 1 and viewed in the direction of the arrow.
Figure 3:
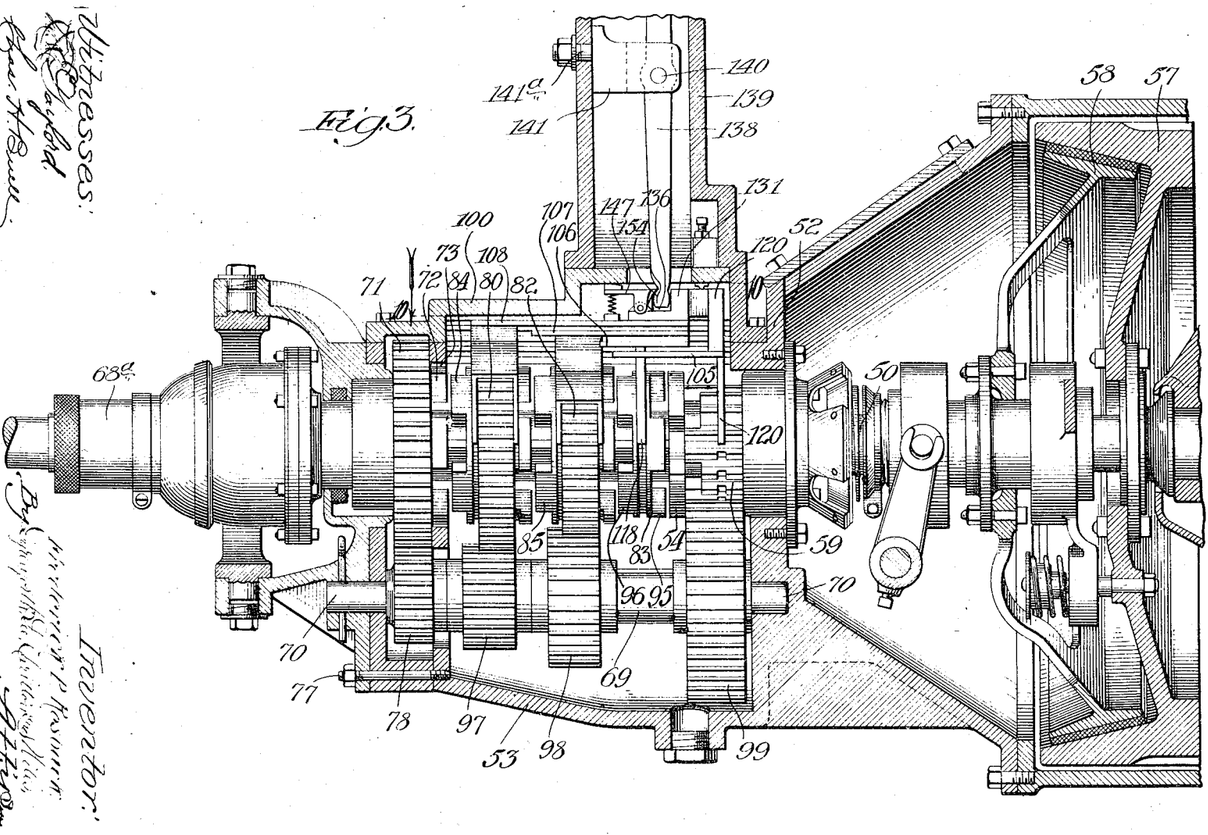
Fig. 3 is an enlarged view like Fig. 1, with certain of the parts, including the transmission-case, shown in section to illustrate the arrangement of the gears and clutch members, with their operating mechanisms, in the case.
Figures 6, 7, 8, 9, 10:
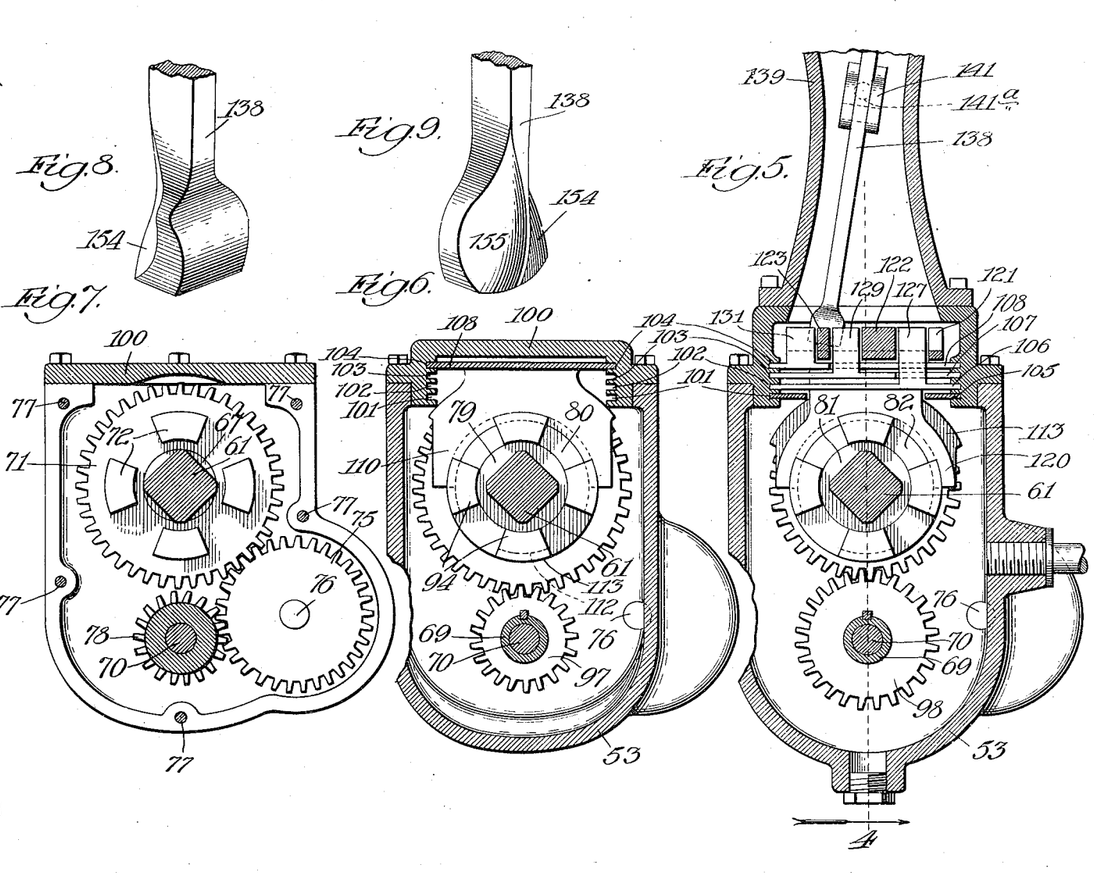
Fig. 6 is a section taken at the line 6 on Fig. 4 and viewed in the direction of the arrow.
Fig. 7 is a section taken at the line 7 on Fig. 4 and viewed in the direction of the arrow.
Fig. 8 is a perspective view of the lower end of the control lever.
Fig. 9 is a similar view of the same, but taken from a different angle.
Fig. 10 is a section taken at the irregular line 10 on Fig. 3 and viewed in the direction of the arrow, this view showing in plan the various sliding members which coöperate with the control lever and serve in the operation of the latter, depending upon the position of this lever, to cause the several gears to be brought into operative condition.
Figures 10, 11, 12, 13, 14, 15, 16, 17, 18, 19:
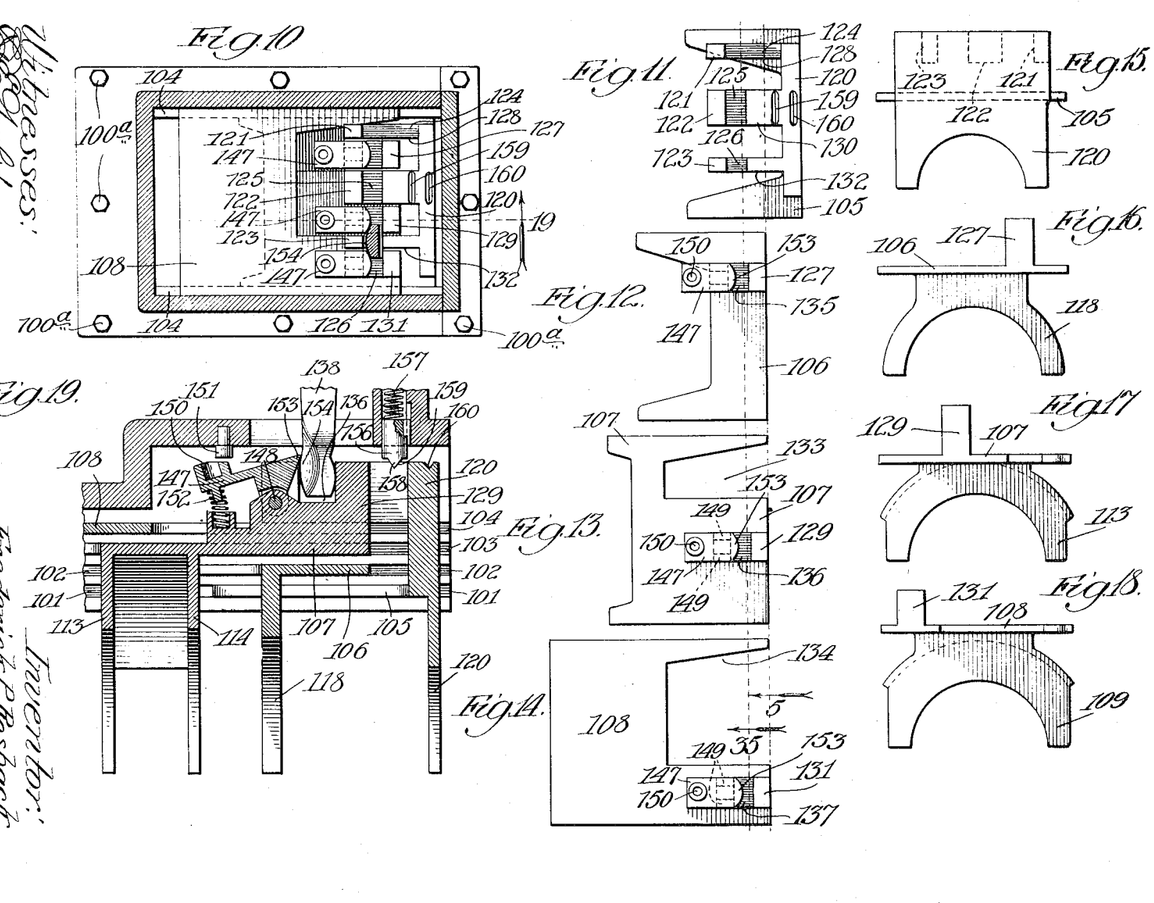
Figs. 11, 12, 13 and 14 are plan views of the said sliding members.
Figs. 15, 16, 17 and 18 are views in end elevation of the members of Figs. 11, 12, 13 and 14, respectively, the parts being viewed from the right hand side of the last referred to figures in the drawing.
Fig. 19 is a section taken at the line 19 on Fig. 10 and viewed in the direction of the arrow.
Figures 20, 21:
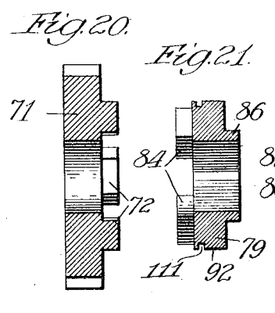
Figs. 20 to 27 inclusive are longitudinal sectional views of the various gears and clutch devices of the transmission mechanism carried by the driven and drive shafts, these views showing in succession the relative positions of these various parts.
Figures 22, 23:
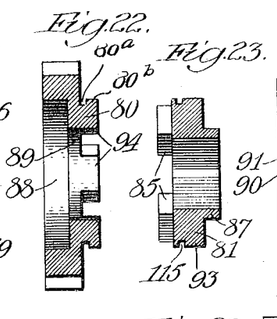
Figures 24, 25:
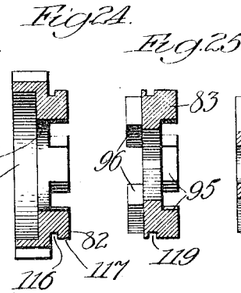

The upper portion of the transmission-casing intermediate the walls 52 and 63, is open as illustrated in Figs. 5, 6 and 7, this portion of the casing having a cover 100 which seats upon the upper edges of the walls 63, 74 and 52, and is secured in place, as by the bolts 100ª. The inner opposed walls of the cover 100 contain a vertical series of guide-grooves 101, 102, 103 and 104 in which slides 105, 106, 107 and 108 are confined at their opposite edges, to have longitudinal movement in these guides. The uppermost slide 108 is provided at its left hand end in Fig. 4, with depending flanges 109 and 110 which are spaced apart as shown, these flanges, which are arc shaped as illustrated, extending into an annular groove 111 in the periphery of the clutch-member 79 and an annular groove 80ª in the reduced end 80ᵇ of the gear 80, this flanged portion of the member 108 thus straddling the gear 80 and serving as a means of shifting the clutch-member 79 and the gear 80 lengthwise of the shaft 61 for the purposes hereinbefore stated. The slide 107 is provided with depending flanges 113 and 114 spaced apart as represented, with their lower edges of arc-shape as shown, these flanges extending into annular grooves 115 and 116 in the periphery of the clutch-member 81 and the reduced portion 117 of the gear 82, this flanged slide thus straddling the gear 82 and serving as a means for shifting the latter and the clutch-member 81, lengthwise of the shaft 61 for the purpose hereinbefore stated. The slide 106 is provided with a depending flange 118 of arc-shape as shown, this flange fitting into an annular groove 119 formed in the periphery of the clutch-member 83 and serving as a means for shifting this clutch-member longitudinally of the shaft 61. The slide 105 is provided with a depending flange 120 of arc-shape as illustrated, which extends into a groove 59ᵃ cut in the teeth of the gear 59, this flanged slide serving as a means for shifting the gear 59 longitudinally of the shaft 61 for the purpose hereinbefore described. The flange 120 continues upwardly above the portion of the slide 105 which extends into the guides 101 and is provided with the lugs 121, 122 and 123 which are spaced apart as indicated, the bottom surfaces of these lugs being located in a plane above the upper surfaces of the body-portion of the slide 105, as shown in Fig. 15. The upper surfaces of these lugs are recessed, as indicated at 124, 125 and 126, respectively, these recesses being in alinement transversely of the slide 105, with the recess 124 extending to the inner surface of the upper portion of the flange 120. The slide 106 which, together with the slides 107 and 108 extend at their right-hand ends in Figs. 12, 13 and 14, in alinement, and only partially overlap the slide 105, is provided with an upwardly-extending lug 127 which, when the parts are assembled as shown, extends into the space between the lugs 121 and 122, this space being represented at 128. The slide 107 is provided with a lug 129 which, when the parts are assembled, extends into the space represented at 130 between the lugs 122 and 123, and the slide 108 carries an upwardly-extending lug 131 which extends into the recess 132 provided in the slide 105. Inasmuch as the slide 106 is below the slide 107, the latter is cut away, as indicated at 133, to permit of the movement of the slide 106 to the left in Figs. 10 and 19 and as the slide 108 is above the slide 107 this slide is recessed, as indicated at 134, to permit of the longitudinal movement of either or both of the slides 106 and 107. The upper surfaces of the lugs 121, 122, 123, 127, 129 and 131 extend into substantially the same horizontal plane, and the lugs 127, 129 and 131 contain, in their upper surfaces, recesses 135, 136 and 137 respectively, which, when the parts of the construction are in the position illustrated in the drawings, extend in alinement with the recesses 125 and 126 in the slide 105, (Fig. 10) this representing the neutral position of the parts of the mechanism. Coöperating with these various slides is a control lever 138, preferably, of the form hereinafter described, and extending upwardly through a section 139 of the cover 100 of the transmission-case and adapted to be moved at its lower end through the alining recesses 124, 125, 126, 135, 136 and 137 and swung at right angles to this movement for shifting these slides. To this end, the lever 138 is pivoted at 140 to a head 141, pivoted at 141ᵃ to the side-wall of the cover-section 139, these pivots being disposed at right angles to each other and forming in effect, a universal joint support for the lever. The upper end of the lever 138 extends through a slot 142 in the top of the cover-section 139, the main portion of this slot being straight and parallel with the alining slots in the slides 105, 106, 107 and 108 and of such length that the lower end of the lever may be shifted into any of these alining slots. The slot 142 opens into branch slots 143, 144, 145 and 146 which are of a width adapting the lever 138 to be moved into them as desired, these slots being spaced apart, especially as shown in Fig. 2, with the slots 143, 144 and 145 extending to the right in Fig. 2 and the slot 146 to the left in this figure. These slots are so arranged that when the lever 138, which is in neutral position when in the straight portion of the slot 142, is shifted into the slot 143, the lower end of this lever will extend into the recesses 126 and 137 and will have forced the slides 105 and 108 to the left in Fig. 4 to effect the proper positioning of the gears and clutches as hereinbefore stated, for reversely driving the shaft 61; when the lever 138 is moved from the slot 143 into the slot 144, its lower end will extend into the recesses 126 and 136 and will shift the slides 105 and 107 to the left in Fig. 4 for driving the shaft 61 at low speed, as hereinbefore explained; when the lever 138 is shifted into the recess 145 its lower end will extend into the recesses 125 and 135 and will shift the slides 105 and 106 to the left in Fig. 4, thus causing the shaft 61 to be driven at medium speed; and when shifted into the recess 146 its lower end will extend into the recesses 124 and 135 and will slide the slide 106 to the right in Fig. 4 to directly clutch together the shafts 50 and 61, the slide 105 remaining stationary in this operation, inasmuch as the recess 124 is cut away as hereinbefore explained.

It will be understood from the foregoing description that each time the lever 138 is moved into the straight portion of the slot 142, into which it must be moved each time the lever is shifted from one operating position to another, all of the slides 105, 106, 107 and 108 assume neutral position.

It will also be understood that when the lever 138 is in neutral, none of the gears are rotating, as none of the gears on the shaft 61 are driven except through the medium of the gears on the counter-shaft 69 which do not operate unless the gear 59 is clutched to the shaft 50. Thus, before the transmission may be operated to drive the shaft 61 at low or medium speeds, or in the reverse direction, the gear 59 must be clutched to the drive shaft 50. While the various coöperating clutch-teeth hereinbefore referred to are shown in the drawings as of such size and arrangement that a comparatively snug fit is produced, this in practice, is not desirable it being preferred that the space between the clutch-teeth be relatively greater than the width of the coöperating clutch-teeth, as for example one-quarter of an inch wider, whereby the clutches may be readily thrown into driving engagement with each other.

It is desirable that some means be provided for holding the various slides hereinbefore referred to, against accidental sliding, as for example under the vibration of the engine, and to releasably hold the gears 80 and 82 against sliding along the shaft.
Desirable means for this purpose are shown in the drawings, these means for the slides 106, 107 and 108 comprising rock-levers 147, pivoted at 148, to the bifurcated portions 149 of the lugs 127, 129 and 131, these levers being provided at their left-hand ends (Fig. 19) with upwardly-opening sockets 150 adapted to embrace the depending portions of pin 151 secured to the under side of the cover-section 100. Springs 152 serve normally to hold the levers 147 in position to lock the respective slides against lengthwise movement. The opposite ends of the levers 147 extend at their portions 153 into the respective slots 135, 136 and 137 as represented, the end-walls of the portions 153 being rounded as represented in the drawings, and extending into the path of the lower end of the lever 138, the latter at the surface thereof which opposes the levers 147, having oppositely inclined faces 154 and 155 which serve in the movement of the lever 138, in either direction in the said alining slots, to cam the members 147 out of engagement with the respective pins 151. Thus when the lever 138 is moved to a position for moving any one of the slides 106, 107 or 108 it automatically unlocks the lever 147 carried thereby to permit the slide to be shifted, the other locking devices holding these other slides against shifting. The locking device for the slide 105 comprises a plunger 156 mounted in a socket 156ª in the top of the cover 100 and backed by a spring 157 which normally spring-presses the plunger at a tooth 158 thereon, against the upper surface of the lug 122, the latter containing recesses 159 and 160 for engaging the tooth 158. When the slide 105 is in neutral position the tooth 158 engages the notch 159 and holds this slide against movement unless directly engaged by the lever 138, and when shifted out of neutral position, the tooth 158 engages the notch 160 and holds this slide against shifting unless directly engaged by the lever 138.

Figures 38, 39, 40, 41, 42, 43, 44, 45, 46:
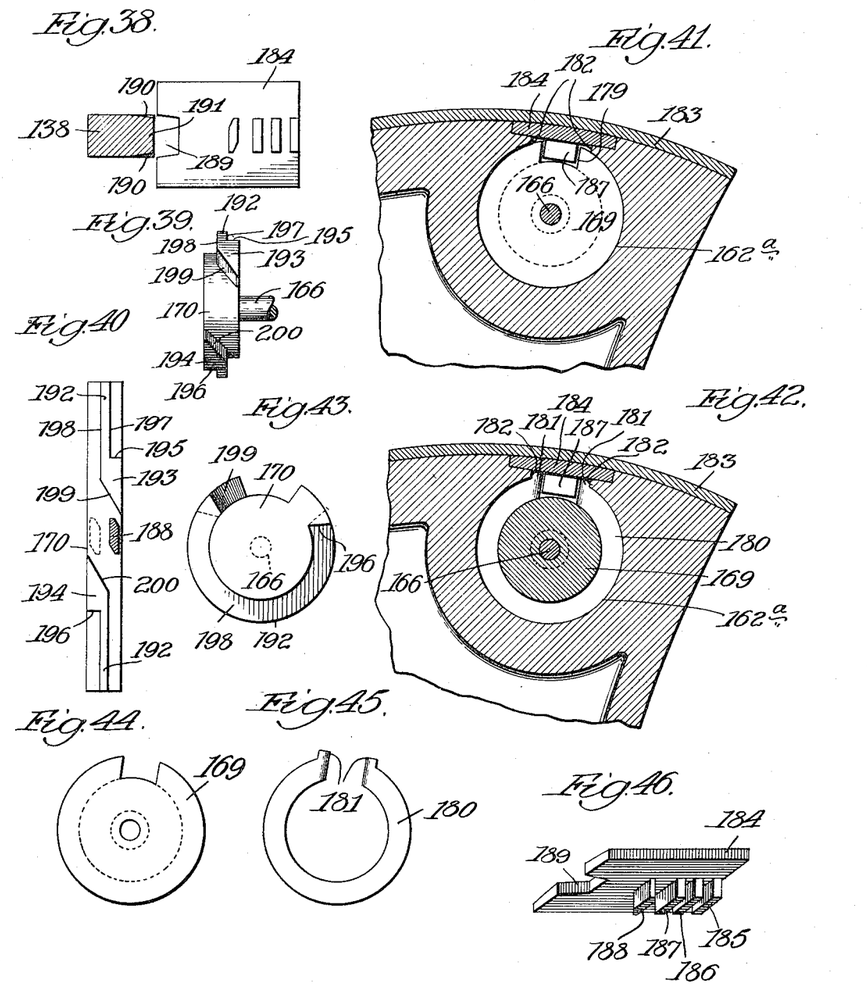
Fig. 38 is a bottom plan view of one of the elements of a locking device employed for locking the control lever in neutral position, this lever being shown in section and the view being taken at the line 38 on Fig. 36 and viewed in the direction of the arrow.
Fig. 39 is a view in side elevation of a rotatable cam-member coöperating with the locking element of Fig. 38 for controlling its position relative to the control lever.
Fig. 40 is a developed view of the periphery of the member shown in Fig. 39.
Fig. 41 is a section taken at the line 41 on Fig. 36 and viewed in the direction of the arrow.
Fig. 42 is a section taken at the line 42 on Fig. 36 and viewed in the direction of the arrow.
Fig. 43 is a view in end elevation of the member shown in Fig. 39, as viewed from the left hand side of this figure.
Fig. 44 is a face view of the disk shown in Fig. 41.
Fig. 45 is a face view of one of a plurality of similar segmental rings forming a part of the mechanism shown in Fig. 36.
Fig. 46, a perspective view of the locking element of Fig. 38, this view being taken in a plane below that in which the locking element extends.

I prefer to provide in connection with the controlling mechanism described, means for releasably locking the control lever 138 in a given position, preferably neutral position,
the means which I have shown for this pur-
pose comprising the following mechanism: Journaled in an opening 161 in a wall 162 of the cover-section 139, are telescoped sleeves 163, 164 and 165, the sleeve 165 containing a rotatable shaft 166. The inner ends of these sleeves project beyond each other in succession as illustrated and are provided with circular disks 167, 168 and 169 respectively, of the same diameter, the shaft 166 carrying a circular disk 170 adjacent the disk 169 and of the same size, and having a knurled finger piece 171 secured thereto at its outer end by which to rotate the shaft and disk 170, these disks being housed in a cylindrical chamber 162ª. The sleeves 163, 164 and 165, which extend beyond each other in succession at their outer ends, carry disks 172, 173 and 174 secured thereto as by the set-screw devices 175, the last-referred-to disks and the knurled member 171 being preferably of the same diameter. The disks 167, 168 and 169 contain in their peripheries annular recesses 176, 177 and 178 which open through corresponding faces of the disks, as shown, a portion of the periphery of each of these disks being slotted as represented at 179, the slots in these various disks alining when the sleeves 163, 164 and 165 are in certain positions. The recesses 176, 177 and 178 preferably contain friction-rings 180 of segmental form as shown in Fig. 45 which are held against displacement by engagement of shoulders 181 thereon, with shoulders 182 provided on the inner surface of the wall of the chamber 162ª in which the disks 167, 168, 169 and 170 are rotatably confined. Coöperating with the disks 167, 168 and 169, is a sliding plate 184 located in the chamber 162ª and having depending lugs 185, 186, 187 and 188, the lugs 185, 186 and 187 which are no thicker than the rings 180, extending into the recesses in the peripheries of these respective rings 180, when the plate 184 is in one position, namely that shown in Fig. 36 wherein this plate is out of locking position, this plate containing in its left hand edge, in Fig. 36, a recess 189, the walls of which embrace the inclined sides 190 of the reduced portion 191 of the lever 138 (Fig. 38), when the plate 184 is shifted to the left in Fig. 36 to the locking position hereinafter referred to. The periphery of the disk 170 is provided with a flange 192 which extends parallel with the faces of this disk and preferably equidistantly therefrom, this flange terminating at its opposite ends in the portions 193 and 194 affording shoulders 195 and 196 adjacent the lateral faces 197 and 198 of the said flange.
A space is provided between the portions 193 and 194 of the disk 170, as represented in Fig. 40, and the end walls of these portions are inclined, as represented at 199 and 200, respectively, these inclined surfaces being preferably parallel with each other and spaced apart, as shown, to form cams. The parts just described coöperate with the lug 188 on the plate, or locking bolt, 184 in the following manner. In the position of the bolt 184 in Fig. 36, the lug 188 extends adjacent the surface 197 of the flange 192, and assuming the slots 179 of the disks 167, 168 and 169 to be in alinement with the depending lugs on the bolt 184, rotation of the shaft 166, through the medium of the knurled member 171, in a clockwise direction in Fig. 41, will cause the cam surface 199 of the disk 170 to engage an end of the lug 188 and force the bolt 184 to the left in Fig. 36 to a position in which it embraces the control lever 138, as hereinbefore stated. In this position of the bolt 184 its lugs 185 and 186 extend into the peripheral recesses in those of the friction rings 180 which are located in the recesses 177 and 178, or in other words, the bolt is shifted, in this operation, from the position shown in Fig. 36, to the left in this figure, a distance substantially equal to the thickness of one of the disks 167, 168 or 169. The operator, to lock the bolt 184 against retraction gives the disks 172, 173 and 174, or any one, or more, of them, a turn to move the recess or recesses 179, as the case may be, out of alinement with the depending lugs on the bolt.

Figures 35, 36, 37:
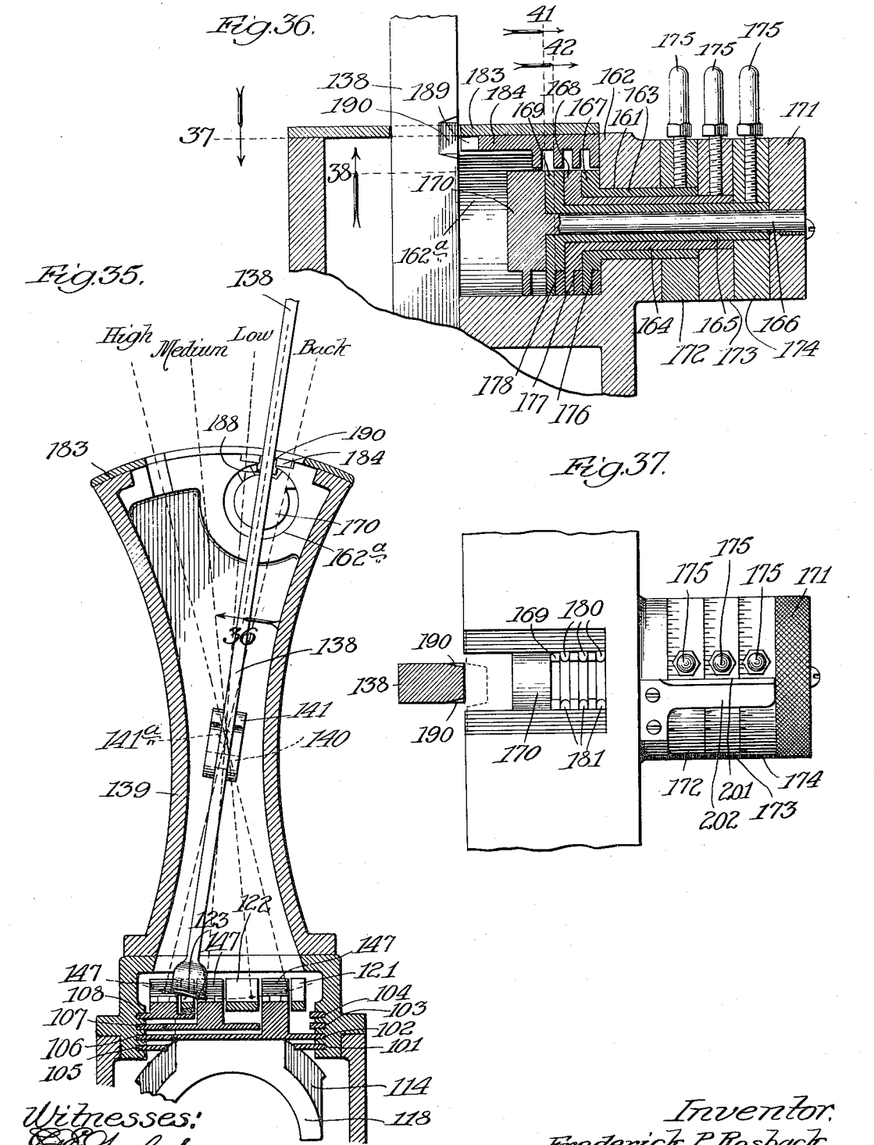
Fig. 35 is a section taken at the line 35 on Fig. 1 and viewed in the direction of the arrow, but showing the control lever in a different position, this section being also indicated at the line 35 on Figs. 11 to 14 inclusive.
Fig. 36 is an enlarged broken section taken at the line 36 on Fig. 35 and viewed in the direction of the arrow.
Fig. 37 is a plan view of the structure shown in Fig. 36, a portion being sectioned, the section being taken at the line 37 on Fig. 36 and viewed in the direction of the arrow.

To retract the bolt it is necessary that all of the disks 167, 168 and 169 be moved to the position shown in Fig. 36 in which their recesses 179 aline with the lugs on the locking bolt, and when the disks are so positioned, the operator, by turning the shaft 166 in anti-clockwise direction in Fig. 42, causes the cam 200 to engage the lug 188 and thereby forces the bolt 184 to the right in Fig. 36 to the position therein illustrated.

It will be understood from the foregoing that the locking means provided are of the permutation type which dispenses with the use of separate keys, the peripheries of the disks 172, 173 and 174 being provided with markings which coöperate with the edge 201 of a relatively stationary bar 202 secured to the wall 162, these markings being preferably in the form of scales, the graduations of which would be preferably numbered as in the case of an ordinary permutation lock, and serving as a guide to the rotation of these disks to proper position for unlocking the mechanism. The locking bolt 184 would therefore be retractable upon rotating the disks 172, 173 and 174 to certain predetermined positions corresponding with the registration of the edge 201 with certain of the graduations on the peripheries of these disks, and thus the operator, knowing the combination, may readily rotate these disks to a position permitting the bolt 184 to be retracted by rotating the shaft 166. The friction rings 180 serve primarily to prevent the rotation of any one of the sleeves 163, 164 and 165 or the shaft 166, from rotating any of the other of these parts, and operates to prevent the making of any sounds by the movement of the operative parts, which would indicate to any one, the position to which the permutation devices of the mechanism should be moved to permit of the retraction of the locking bolt.

While I have illustrated and described a particular construction in which my invention is embodied, I do not wish to be understood as intending to limit it thereto, as the same may be variously modified and altered without departing from the spirit of my invention, it being my intention to claim my invention as fully and completely as the prior state of the art will permit.

What I claim as new and desire to secure by Letters Patent is:—

1. In gear transmission, the combination of a shaft, a gear thereon, a second shaft, clutch-members rotatable with said second shaft and relatively movable lengthwise thereof, and a gear member rotatable on one of said clutch-members and constantly in mesh with said gear, said clutch-members adapting said gear member to be clutched to one thereof in one position of the said parts.

2. In gear transmission, the combination of a shaft, a gear thereon, a second shaft, clutch-members rotatable with said second shaft and relatively movable lengthwise thereof, and a gear member rotatable on one of said clutch-members and constantly in mesh with said gear, said clutch-members adapting said gear member to be clutched to the one thereof other than the one on which said gear member is rotatable, in one position of the said parts.

3. In gear transmission, the combination of a shaft, a gear thereon, a second shaft, clutch-members rotatable with said second shaft and relatively movable lengthwise thereof, and a gear member rotatable on one of said clutch-members and constantly in mesh with said gear, said gear member being provided with clutch-teeth adapted to interlock with the teeth on the other of said clutch members in one position of the said parts.

4. In gear transmission, the combination of a shaft, clutch-members rotatable therewith, a gear member rotatable on one of said clutch-members and provided with clutch-teeth for interlocking with the teeth on the other of said clutch-members, and means for shifting said gear member and the clutch member on which it is journaled, together along said shaft toward and away from the one of said clutch-members with which the teeth on said gear member interlock.

5. In gear transmission, the combination of a shaft, clutch-members rotatable therewith, a gear member rotatable on one of said clutch-members and provided with clutch-teeth for interlocking with the teeth on another of said clutch-members, the clutch-member on which said gear member is rotatable being adapted for interlocking engagement with the teeth on another of said clutch-members, and means for shifting said clutch-devices along said shaft for moving said clutch-devices into and out of clutching engagement.

6. In gear transmission, the combination of a shaft, clutch-members rotatable therewith, a gear member rotatable on one of said clutch-members and provided with clutch-teeth for interlocking with the teeth on another of said clutch-members, the clutch-member on which said gear member is rotatable being adapted for interlocking engagement with the teeth on another of said clutch members, and means for shifting said gear member and the clutch member on which it is journaled, together along said shaft, toward and away from the other clutch-members for the purpose set forth.

7. In gear transmission, the combination of a shaft, clutch-members rotatable therewith, a gear-member rotatable on one of said clutch-members, and means for shifting said gear-member and said last-referred to clutch-member together along said shaft, to move said gear into and out of clutching engagement with the other of said clutch-members.

8. In gear transmission, the combination of a drive-member provided with a clutch, a gear rotatably mounted thereon and adapted to be slid along the shaft into and out of interlocking engagement with said clutch, a counter-shaft, gears on said counter-shaft and rotatable therewith, one of said gears meshing with the gear on said drive-shaft, a driven shaft, a series of clutch-members surrounding said driven shaft and rotatable with the latter and movable along this shaft, gears surrounding said driven shaft and rotatable relative thereto, certain of said gears surrounding and having bearing on certain of the clutch-members on said driven shaft, certain of said gears on said driven shaft meshing with certain of the gears on said counter-shaft, an idler gear interposed between and meshing with the other gears on said counter and driven shafts, one of said clutch-members on said driven shaft being adapted to be moved into and out of engagement with the clutch-member on said drive-shaft, gears on said driven shaft being provided with portions adapted to coöperate with the adjacent portions of adjacent ones of said clutch-members when said gears and said clutch-members on said driven shaft are moved into certain positions along said shaft, and means for shifting said clutch-members and the shiftable ones of said gears on said driven shaft, along the latter, for the purpose set forth.

9. In gear transmission, the combination of a plurality of slidably supported members arranged in superposed relation to each other and provided with portions which extend into substantially the same plane, said members being recessed to permit of the relative movement of said members, and a slide-shifting member adapted to be adjusted into registration with the said portions of said members for selectively actuating the latter.

10. In gear transmission, the combination of a plurality of slidably supported members arranged in superposed relation to each other and provided with portions which extend into substantially the same plane, said portions of said members containing recesses which in one position of the mechanism extend in substantial alinement with each other, and a slide-shifting member adjustable into any one of the said recesses and adapted to selectively actuate said first-named members.

FREDERICK P. ROSBACK.